(12) United States Patent
Zhou et al.

(10) Patent No.: US 8,270,797 B2
(45) Date of Patent: Sep. 18, 2012

(54) SPLICE HOLDER FOR COMMUNICATION SOCKET

(75) Inventors: Junsheng Zhou, Shanghai (CN); Pierre Bonvallat, Cluses (FR); Zhiyong Xu, Shanghai (FR)

(73) Assignee: 3M Innovative Properties Company, St. Paul, MN (US)

( * ) Notice: Subject to any disclaimer, the term of this patent is extended or adjusted under 35 U.S.C. 154(b) by 218 days.

(21) Appl. No.: 12/679,791

(22) PCT Filed: Sep. 10, 2008

(86) PCT No.: PCT/US2008/075757
§ 371 (c)(1),
(2), (4) Date: Jun. 1, 2010

(87) PCT Pub. No.: WO2009/045689
PCT Pub. Date: Apr. 9, 2009

(65) Prior Publication Data
US 2010/0310222 A1    Dec. 9, 2010

(30) Foreign Application Priority Data

Sep. 28, 2007  (CN) .......................... 2007 1 0163003

(51) Int. Cl.
*G02B 6/00* (2006.01)
(52) U.S. Cl. ...................................... 385/135
(58) Field of Classification Search .................. None
See application file for complete search history.

(56) References Cited

U.S. PATENT DOCUMENTS

| | | | |
|---|---|---|---|
| 4,441,785 A | 4/1984 | Petrozello | |
| 4,502,754 A | 3/1985 | Kawa | |
| 4,702,551 A | 10/1987 | Coulombe | |
| 4,863,233 A | 9/1989 | Nienaber et al. | |
| 4,976,510 A | 12/1990 | Davila et al. | |
| 5,323,480 A | 6/1994 | Mullaney et al. | |
| 5,835,657 A * | 11/1998 | Suarez et al. | 385/135 |
| 6,188,826 B1 * | 2/2001 | Daoud | 385/135 |
| 6,249,635 B1 * | 6/2001 | Daoud | 385/137 |
| 6,275,639 B1 | 8/2001 | Bolt et al. | |
| 6,282,360 B1 * | 8/2001 | Milanowski et al. | 385/135 |
| 6,315,598 B1 | 11/2001 | Elliot | |
| 6,379,166 B1 | 4/2002 | Hagarty et al. | |
| 6,435,727 B1 | 8/2002 | Fingler et al. | |
| 6,496,638 B1 * | 12/2002 | Andersen | 385/135 |
| 6,543,940 B2 | 4/2003 | Chu | |
| 6,810,193 B1 * | 10/2004 | Muller | 385/135 |

(Continued)

FOREIGN PATENT DOCUMENTS

JP   2005-189438 A   7/2005

(Continued)

Primary Examiner — Tina Wong
(74) Attorney, Agent, or Firm — Janet A. Kling (57) ABSTRACT

The present invention discloses a splice holder, which is used for holding at least one splicing sleeve (4), each of the splicing sleeves (4) is used for coupling two optical fibers. The splice holder comprises: a body; a splice channel (7) provided on the body; and an elastic device (9) in each splice channel, wherein the elastic device holds the splicing sleeve (4) elastically in the splice channel. The present invention also includes a communication socket having a splice holder mounted therein. By the splice holder of present invention, optical fiber connection points can be accommodated in a communication socket, so that electrical cables and optical fibers in the communication socket may be managed in an orderly way. Furthermore, inclusion of the inventive splice holder ensures than a minimum bending radius of optical fiber can be maintained when the optical fiber is stored in the communication socket.

13 Claims, 6 Drawing Sheets

U.S. PATENT DOCUMENTS

| | | |
|---|---|---|
| 7,274,852 B1 * | 9/2007 | Smrha et al. .................. 385/135 |
| 7,406,241 B1 | 7/2008 | Opaluch et al. |
| 2003/0002810 A1 | 1/2003 | Cheng |
| 2004/0013389 A1 | 1/2004 | Taylor |
| 2007/0104447 A1 * | 5/2007 | Allen ........................... 385/135 |
| 2007/0274662 A1 * | 11/2007 | Bayazit et al. ................ 385/135 |

FOREIGN PATENT DOCUMENTS

| | | |
|---|---|---|
| KR | 20-0399079 Y1 | 10/2005 |
| KR | 20-0417161 Y1 | 5/2006 |
| KR | 10-2006-078009 A | 7/2006 |
| KR | 10-0645503 B1 | 11/2006 |
| TW | 371486 | 10/1999 |
| TW | M252939 | 12/2004 |
| TW | M253779 | 12/2004 |
| TW | M271166 | 7/2005 |
| TW | I275258 | 3/2007 |
| TW | M308413 | 3/2007 |
| WO | WO 97/44872 | 11/1997 |
| WO | WO 2008/124293 | 10/2008 |

* cited by examiner

SPLICE HOLDER FOR COMMUNICATION SOCKET

CROSS REFERENCE TO RELATED APPLICATIONS

This application is a national stage filing under 35 U.S.C. 371 of PCT/US2008/075757, filed Sep. 10, 2008, which claims priority to Chinese Application No. 200710163003.7, filed Sep. 28, 2007, the disclosure of which is incorporated by reference in its/their entirety herein.

FIELD OF INVENTION

The present invention relates to a splice holder, and more particularly, to a splice holder which holds at least one splicing sleeve adapted to couple two optical fibers, and the present invention also provides a communication socket for installing the splice holder, the communication socket is used for connecting the optical fiber and electrical cable in the communication network.

BACKGROUND OF INVENTION

In Fiber to the Home (FTTH) and Fiber to the Desk (FTTD) applications, a communication socket may serve as a terminal relay device for optical fibers and electrical cables (e.g. electrical cables, optical cables or coax cables). In the market, conventional communication sockets are installed on a wall surface in a premise or home. The communication sockets permit connection of pre-terminated optical fiber patch cords and electrical cables to the network optical fibers and electrical cables installed either in the walls or on the walls of a home or premise. Generally, the optical fiber connection requires three individual pieces, a fiber connector plug on the patch cord, a fiber connector plug on a fiber pigtail connected to the installed network optical cable, and a fiber connector socket. The fiber connector socket serves as a coupling between two optical connector plugs and protects the optical connection point. In contrast, electrical cable connections have a two part structure which include an electrical cable connector or plug which may be inserted into a jack or socket which is connected to the installed cable. Such communication sockets are popular with consumers and installers because of their convenient installation and flexible connection options.

However, existing communication sockets which are capable of accommodating both electrical and optical fiber connections are usually large, thus, can only be installed individually or mounted on a special wall-based box and can not be fitted together with a normal in-wall standard base box.

While wall-mounted communication sockets are known that accommodate a plurality of fiber and electrical cable connectors at the same time, they are too large to fit with current wall-based boxes (i.e. an 86 mm×86 mm standard wall-based box).

In contemporary premise network wiring, the optical fiber is connected to a fiber pigtail by a fusion or mechanical splice. In some cases, the splice point between optical fibers does not fit within the existing box and is therefore placed outside of the box. This results in the splice not having adequate protection or the incurring extra costs to add an addition box to protect the splice. Furthermore, conventional communications sockets are unable to provide an efficient solution which accommodates the splice in a compact size while also ensuring that the minimum bending radius of the optical fiber is not violated.

Accordingly, a communication socket that is adapted to the 86 mm×86 mm standard with the splicing point accommodated therein is needed to further expand FTTH and FTTD networks in the premise or home.

SUMMARY OF INVENTION

A first embodiment of present invention provides a splice holder, said splice holder accommodates optical fiber splicing point in a communication socket, so that the electrical cable and optical fiber in the communication socket become orderly, and at the same time, the operation of the communication socket become more easily.

Furthermore, the present invention provides a splice holder that can guarantee a minimum bending radius of an optical fiber. Meanwhile, it allows optical fiber to be stored in the communication socket.

In addition, another object of the present invention provides a splice holder which cooperates with a communication socket such as 86 mm×86 mm standard communication socket. The shortcoming in the art can be solved by the splice holder of present invention.

The present invention further provides a communication socket, which comprises a splice holder of present invention.

According to an aspect of the present invention, a splice holder for holding at least one splicing sleeve is provided, each of the splicing sleeve is used for coupling two optical fibers, said splice holder comprises: a body; at least a splice channel provided on said body; an elastic device provided in each splice channel, said elastic device holds said splicing sleeve elastically in said splice channel; and an optical fiber guiding part bent away from the side of the splice holder on which the splice channel is provided and forming an optical fiber inlet with a sloped entrance portion.

According to another aspect of the present invention, a communication socket is provided, comprising: a base having a bottom wall and a plurality of sidewalls; a cover which is removably fitted with said base; a plurality of optical fiber inlets provided on the sidewalls and bottom wall thereof; and a splice holder according to the invention, said splice holder may be provided on said base for holding said splicing sleeve.

BRIEF DESCRIPTION OF THE DRAWING

The present invention will be further described with reference to the accompanying drawings, wherein.

Additional objects, disclosures, advantages and aspect of the present invention will be more readily apparent for those skills in art from the following detailed description of preferred embodiment when taken together with accompanying drawings; such accompanying drawings and embodiment are only for the explanation purpose.

DETAILED DESCRIPTION OF EMBODIMENTS

A splice holder and a communication socket with the splice holder according to the invention will be described in detail in conjunction with the FIGS. 1 to 8.

Figure 1:
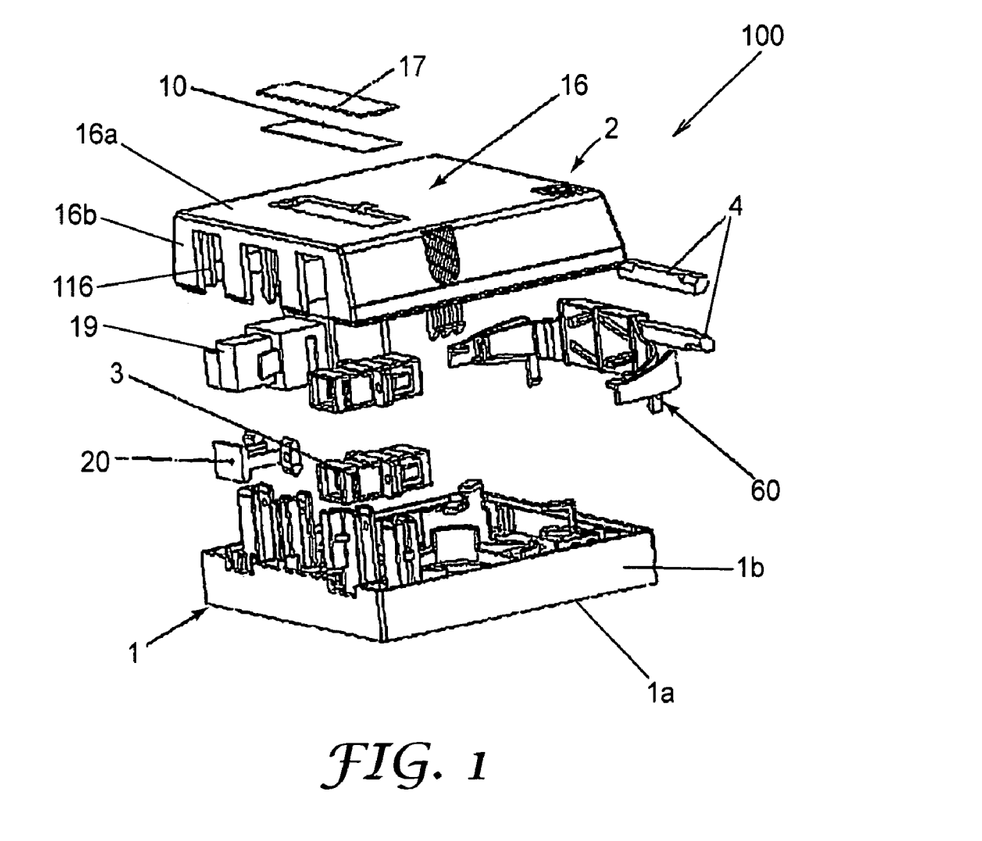
FIG. 1 is an exploded perspective view of a communication socket according to the present invention.

FIG. 1 is an exploded perspective view of a communication socket 100 according to an embodiment of the invention. A communication socket 100 as shown in FIG. 1 has a base 1 and a cover 2. The base 1 and the cover 2 can be fitted with each other by a detachable connection configuration, for example, by means of a snap connection. In an embodiment of the invention, the shapes of the base 1 and the cover 2 are rectangular, but those skilled in the art could understand that other shapes may be used instead, and the example is only for illustration purpose rather than limitation The cover 2 has a top wall 2a and four side walls 2b. The sidewalls 2b may be attached to the bottom edges of the top wall and extend laterally away from the top wall. In some embodiments, the side walls 2b may be substantially perpendicular to the top wall 2a.

Alternatively, at least one of the side walls 2b may extend obliquely from the top wall. One or more connection ports 116 may be formed in a sidewall of the cover to allow external terminated optical fiber and electrical cables to be connected to the communication socket 100.

The base 1 has a bottom wall 1a and four side walls 1b which may be attached to the edges of the bottom wall and extend away from the bottom wall 1a such that the side walls 1b may be substantially perpendicular to the bottom wall.

In an exemplary embodiment of the present invention, the communication socket 100 can accommodate and secure a fiber connector socket 3 to interconnect an external pre-terminated patch cord with a connectorized fiber pigtail. In an embodiment of the invention, the communication socket 100 also can accommodate and secure an electrical cable connector jack 19 which can receive an external cable plug.

Inside the communication socket can be accommodated with a fiber connector socket 3, a pigtail (not shown) through which an input optical fiber may be connected to the fiber connector socket 3, an optical fiber splicing sleeve 4 for connection between two optical fibers, a electrical cable connector jack 19, such as a keystone jack etc., for connecting the incoming cable, blind port plates 20 disposed at the position of such connectors in order to seal the port of the communication socket, when there are no optical fiber connectors or cable connectors installed in the communication socket 100. Further, for indication purpose, a label 18 may be put on the cover 2, which may be covered by a label cover 17, the label cover 17 prevents the label 18 from being damaged.

The structure of the base 1 of the communication socket will be described in detail in conjunction with FIG. 6. In this exemplary embodiment, the base 1 has a bottom wall 1a and a plurality of side walls 1b. A fiber socket mounting portion 23 for installing the fiber connector socket 3 and a cable jack mounting portion 24 for installing electrical cable connector jack 19 are disposed on the bottom wall 1a of the base 1. In the embodiment, mounting portions 23, 24 comprise two posts 231, 241 that are attached to and extend vertically from the bottom wall 1a. Opposing grooves are provided on each post, for inserting the fiber connector socket 3 and similar grooves are provided on the posts for inserting the electrical cable connector jack 19. In addition, each post for inserting fiber connector may include with a spherical protrusion 25 for locking the inserted connector socket into their respective mounting portions. When the connector is inserted into its corresponding the mounting portion, the position of mounting portion corresponds to the position of connection port which is provided on the side wall of the case. It should be noted that the amount of optical fiber socket mounting portion 23 and cable jack mounting portion 24 can be set based on the demand of network relay. In the exemplary embodiment shown in FIG. 6, the three mounting portions are shown (i.e. one cable jack mounting portion 24 and two fiber socket mounting portions 23).

Blind port plates 20 (FIG. 1) can seal the connection ports 116 when they are not in use. Alternatively, the connection ports 116 can be formed by a removable portion (such as a knock-out portion) which is formed on the side wall of the cover 2.

Figure 4:
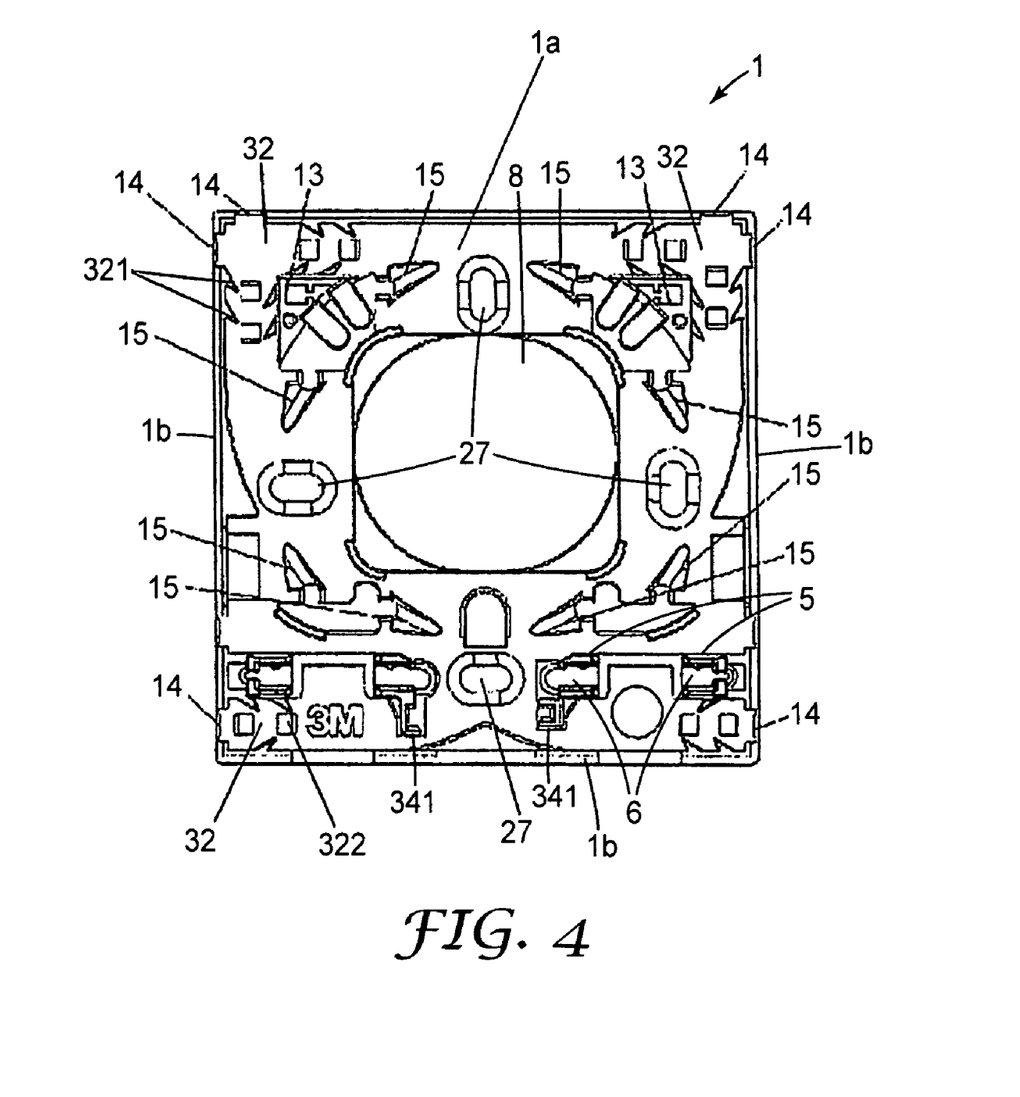
FIG. 4 is a top view of a base of the communication socket in the FIG. 1 according to the present invention.

A plurality of installation holes 27 are provided on the bottom wall 1a of the communication socket 100. Referring to FIG. 4, therefore, the base 1 has two installation directions, so that the ports of the communication socket may be faced downward to ensure secure operation.

The fiber connector can be, for example, SC, MU, ST, FC or LC connector; it also can be PC or APC (angled polished connector) type. The examples of connectors include 3M™ Hot-melt LC connector, and 3M™ CRIMPLOK™ ST SM 1 26 UM connector, such connectors are available from 3M Corporate (St. Paul, Minn., USA). The fiber connector socket is selected to mate with the connector interface of the optical connector on the patch cord and the optical connector of the fiber pigtail. The cable connector can be RJ-11, RJ45 or coaxial connectors. The electrical cable jack is selected to mate with the cable connector on the external cord. The splicing sleeve can be a fusion sleeve or a mechanical splicing sleeve.

According to the present invention, the splice holder 60 will be described in the following description in conjunction with the FIGS. 1-3. The splice holder 60 may be used in combination with the communication socket described above (it will be described in detail later). Splice holder 60 is adapted to be attached to and elevated above the base 1. Any residual length of fiber is stored at a first elevation adjacent the bottom call of the base 1. The ends of two optical fibers to be spliced together are routed to a second elevation of the splice holder 60.

The splice holder 60 is used for holding at least one splicing sleeve 4, each splicing sleeve 4 is used for coupling two optical fibers. The splice holder 60 comprises a body 21 two side walls integrally extending from the surface of body 21 and a central partition 73 located between and running parallel to the side walls.

Figure 2:
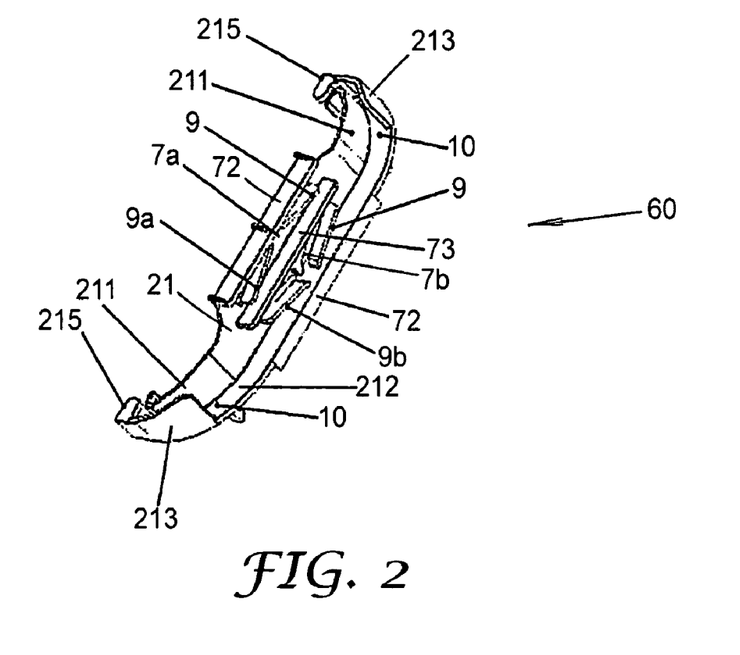
FIG. 2 is a perspective view of a splice holder for the communication socket according to the present invention.

As shown in FIG. 2, splice holder 60 includes first splice channel 7a and second splice channel 7b. Thus, in one aspect, the first splice channel 7a can secure a mechanical splice and the second splice channel 7b can secure a fusion splice, or vice versa. Although only two separate channels are shown as connecting channels for this embodiment, a splice holder 60 may be configured to include more splice channels, to secure, e.g., three splices, four splices, or more splices, as would be apparent to one of ordinary skill in the art given the present description.

Each connecting channel 7a, 7b includes one or more flexible arms, such as elastic devices 9. In an aspect of the invention, each channel includes a plurality of flexible arms spaced along the length of the splice channel. The flexible arms are configured to provide a resistance against a splice member or similar structure (see e.g., FIG. 2). The flexible arms can be provided on a central partition 73 of said splice channel 7a, 7b opposing to both sides of said splice channel 7a, 7b, so as to hold the splicing sleeve against the sides thereof. Alternatively, the flexible arms 9a of the first splice channel 7a and flexible arms 9b of the second splice channel 7b can extend from sidewalls 72. In the embodiment shown in FIG. 2, arms 9a extend from the side wall, i.e., outer channel wall 21, adjacent to first splice channel 7a and flexible arms 9b extend from the side wall 72 adjacent to the second splice channel 7b. In addition, the flexible arms extend laterally into their respective splice channel by a substantial amount of the entire width of the splice channel.

With the flexible arm, different kinds of splice sleeve can be used for fiber splicing and can be secured in splice channel.

Further referring to FIG. 2, the splice holder 60 has a generally bowed shape. Splice holder 60 has a planar central area including the body 21 and two arched optical fiber guiding parts 10 for guiding optical fibers on either side of the body 21. The optical fiber guiding part 10 comprises a first optical fiber guiding wall 211 which is formed by integrally extending outwardly from both ends of the body 21; and a second optical fiber guiding wall 212 which is formed by integrally extending outward from each end of side wall 72 adjacent the second splice channel 7b. Thus, the optical fiber may pressed against the first optical fiber guiding wall 211 and supported on the optical fiber guiding wall 72 to enter or exit from the splicing sleeve 4. As shown in FIG. 2, the optical fiber guiding part 10 is bent in a direction away from the surface of the body where the splice channels 7a, 7b for holding splice sleeves 4. It should be noted, that the bending curvature of the optical fiber guiding part 10 should not impact the transmission of the transmitted signal of the optical fibers while the minimum bending radius of the optical fiber is maintained at the inlet or outlet thereof. In an embodiment, the optical fiber guiding part 10 is formed with an optical fiber inlet or outlet which has a sloped shape 12 to transition the fiber to be spliced smoothly from a first elevation where slack is stored to a second elevation in the splice holder.

The optical fiber guiding part 10 may further comprise a third optical fiber guiding wall 213. The third optical fiber guiding wall 213 is disposed substantially parallel to the first optical fiber guiding wall 211 and is substantially perpendicular to and extends from the edge of the second optical fiber guiding wall 212. The third optical fiber guiding wall 213 may be shorter than the first optical fiber guiding wall so as to expose the body 21 provided with splice channels 7a and 7b for holding splicing sleeves 4 making it convenient to install or remove the optical fiber splicing sleeves. This can help prevent damage to the optical fiber splicing sleeve during the installation of optical fiber splicing sleeve. The third optical fiber guiding wall 213 ensures that the optical fiber rests within the confines of the communication socket. Thus when the cover is put on the base, the optical fiber is not damaged by clamping or pinching the optical fiber between the base and cover of the communication socket.

Figure 3:
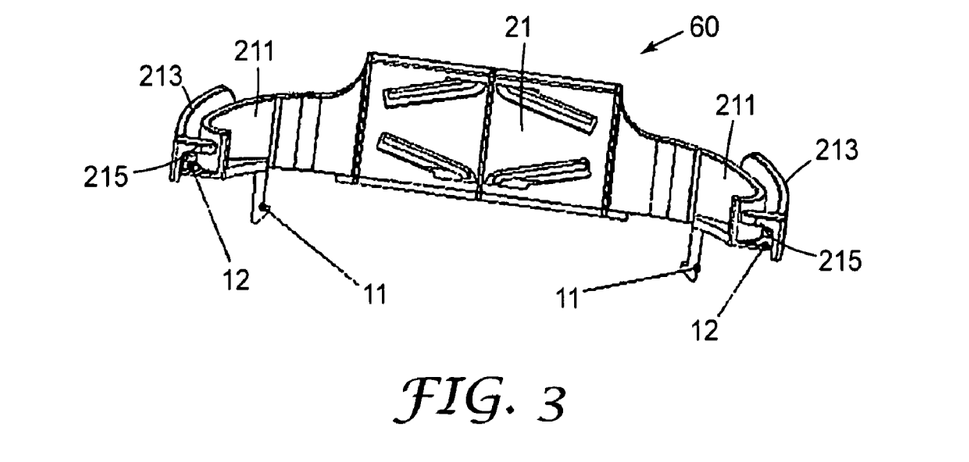
FIG. 3 is a rear view of the splice holder in FIG. 2.

As shown in FIGS. 2 and 3, wings 215 are provided at the distal end of the third optical fiber guiding wall 213 to prevent the optical fiber detaching from the optical fiber guiding part 10. In an exemplary embodiment, the wings are located at an end of optical fiber guiding part 10 away from body 21. Thus, the wings 215, the first, second, and third optical fiber guiding walls 211, 212 and 213 define an optical fiber inlet through which the optical fiber enters the optical fiber guiding part 10. Thus, the wing 215 holds the optical fiber more securely. The present invention is not limited to the detail structure of wings 215 described above. The wings can employ any structure and design which allow the optical fiber to be securely accommodated in optical fiber guiding part 10.

Further, the splice holder 60 according to an embodiment of present invention comprises at least one installation member 11 to attach the splice holder to the communication socket of the present invention. The installation member 11 may be a connecting clip. The connecting clip can match the aperture 13 in the base 1 of communication socket 100. When the splice holder 60 is removed from the communication socket, the connecting clip can be drawn out of aperture 13. Alternatively, the connecting clip can be provided on the base and the aperture can be disposed on the splice holder. In another embodiment, the splice holder may also be connected to the communication socket by a pin structure (not shown). In another embodiment, the splice holder may be connected to the communication socket by a screw or other mechanical fastener. The examples above should not be considered limiting, they are for illustrative purposes. Those skilled in the art can utilize any known structure or configuration for connecting the splice holder to the communication socket.

As shown in FIG. 4, a plurality of thin walled portions 14 which may be removed to allow an optical fiber to enter the communication socket. These thin-wall portions are integrally formed on the side wall before the communication socket is installed. When the optical fiber is connected, a thin-wall portion may be knocked off at the required position to form an opening for the optical fiber to pass through. The position of openings with respect to the bottom wall 1a in normal direction is lower than the height at which the fiber connector socket 3 is mounted in the communication socket. Thus, a space is formed between the bottom wall 1a of the base 1 and the fiber connector socket 3 to allow for slack storage. Thus, when the optical fiber or cable passes through the opening created by the removal of the thin walled portion 14, the optical fiber or cable may pass through from the space between the fiber connector socket 3 and the base 1. The space is especially favorable for connecting optical fibers which enter the communication socket in the proximity of the mounting portions 23, 24. This makes omni-directional optical fiber entry possible. In addition, the flexibility of connecting an optical fiber is enhanced. According to the invention, additional openings can be provided by those ordinary skilled in the art based on the requirements of introducing the optical fiber.

Moreover, according to the invention, the fiber socket mounting portion 23 is formed so that at least two fiber sockets can be provided therein in a direction perpendicular to the bottom wall 1a of the base 1. Therefore, the installation height of the fiber socket mounting portion 23 may be greater than or equal to two times of the installation height of fiber connector socket 3. When two optical fibers are introduced into such two optical fiber sockets, they can be divided into an upper layer and a lower layer in the same fiber socket mounting portion 23.

In this way, the size of the communication socket can be made as small as possible while the minimum bending radius of optical fiber is ensured. Furthermore, in order to clear the paths of the upper and lower layers of the optical fibers inside the case and to avoid the damage to the optical fibers, the communication socket 100 may further comprise an optical fiber guide member 26 integrally formed and extending from on the bottom wall 1a (see FIG. 6). The optical fiber guide member 26 comprises two optical fiber holding parts or tabs 26a, 26b which are positioned at the different heights with respect to the bottom wall, for holding the upper and lower layer of optical fiber which may be laid in parallel layers. The height of optical fiber holder parts 26a, 26b may correspond to the position in a perpendicular direction of two optical fiber sockets installed in the fiber socket mounting portion 23.

The embodiment of the inventive communication socket shown in FIG. 4 further includes a plurality of optical fiber inlets 15 provided through the bottom wall 1a of base 1. Optical fiber inlets 15 can be used to introduce an optical fiber from the rear side of the bottom wall of the base. Eight optical fiber inlets 15 are shown in FIG. 4, but a different number of inlets may be used if needed for a desired network design. These optical fiber inlets 15 employ a sloping curved configuration to ensure optical fiber can be introduced into the communication socket from a rear side of the bottom wall smoothly, but also to ensure the bending radius of optical fiber. This avoids damage to the optical fiber due to too small of a bending radius.

Figure 5:
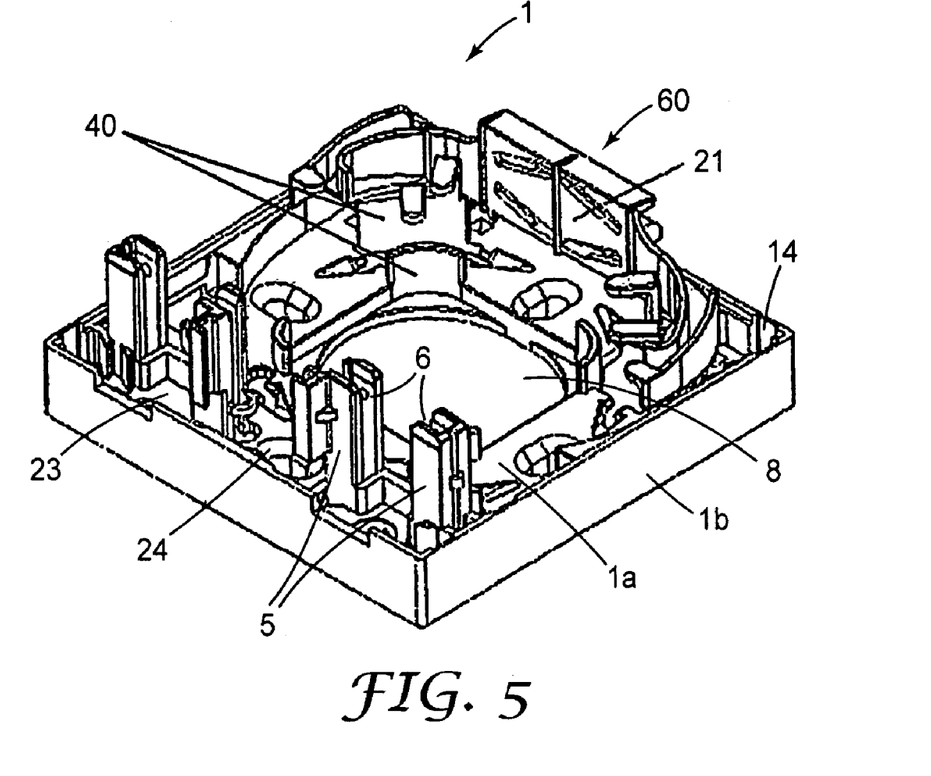
FIG. 5 is an assembly view of the splice holder being installed onto the communication socket according present invention.
Figure 6:
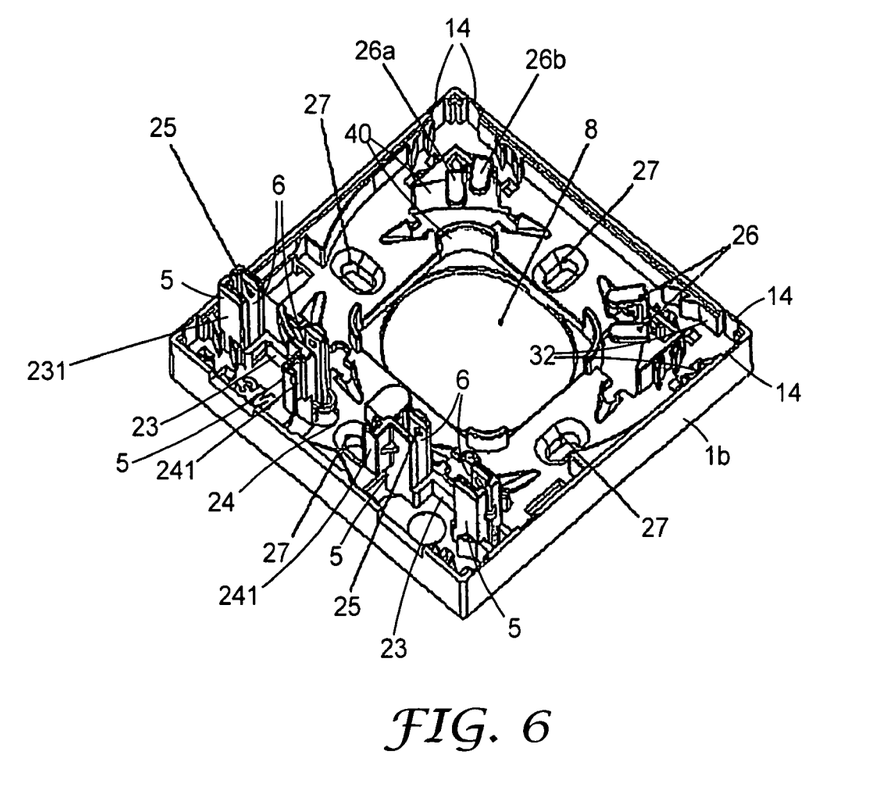
FIG. 6 is a detailed structural view of communication socket shown in FIG. 1.
Figure 7:
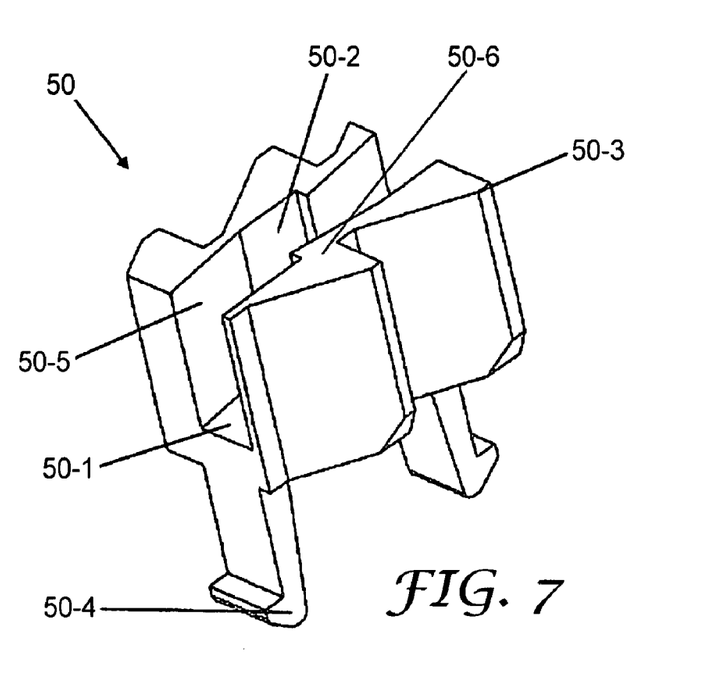
FIG. 7 is a perspective view of a cable adapter according to the invention.

Referring to FIGS. 4-6, a large central cable hole 8 is provided at the center of the bottom wall 1a of the base 1 for passing an electrical cable from the rear part of the base into the communication socket. The shape of cable hole is not limited to circular as shown in the drawings; other shapes may also be used.

Further, a plurality of annular wall portions 40 are provided around the central hole 8 for storing optical fiber. The annular area may accommodate and store the optical fiber such that the minimum bending radius of the optical fiber is maintained. Additionally, a plurality of optical fiber fixing grooves 32 may be integrally formed adjacent the side walls 1b of base 1 near the thin walled portions 14. A plurality of fixed protruding ribs 321 are provided along the side of the optical fiber fixing grooves to clamp the incoming optical fiber cable for cable strain relief. As shown in FIG. 4, the protruding rib may be in the form of a fin to clamp the sheath of the optical fiber cable. When a small diameter optical fiber cable is used, the communication socket 100 may further comprise an optical fiber adapter 50. The optical fiber adapter 50 comprises a bottom 50-1 and at least one side wall 50-2 extending from the top side of the bottom 50-1. The at least one side wall 50-2 comprises projections 50-3 having a shape that may be mated with the fixed protruding ribs 321 in the optical fiber fixing grooves 32. The optical fiber adapter 50 may further include a hook 50-4 extending from the side of the bottom 50-1 opposite side wall 50-2. The adapter 50 may securely fasten to the communication socket by engaging hooks 50-4 with holes 322 in the optical fiber fixing grooves 32. Alternatively, the optical fiber adapter 50 may include two side walls 50-2 extending from the top side of the bottom 50-1. A groove 50-5 is formed between the two side walls 50-2, protruding ribs 50-6 for clamping the sheath of the cable is provided at an inner surface of the groove 50-5.

Figure 8:
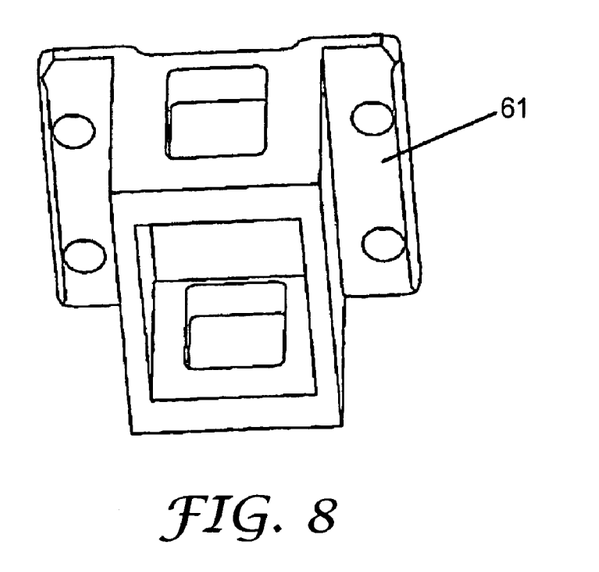
FIG. 8 is a perspective view of connector adapter.

The communication socket 100 of the embodiment also provides a connector adapter 61 (FIG. 8). Different types of fiber optic connector sockets may be installed in the fiber socket mounting portion 23 and cable jack mounting portion 24 by the connector adapter 61. For example, the adapter 61 is used for installing bi-LC optical fiber coupling. However, it also can be used for other connector couplings of other sizes.

Furthermore, when the splice holder 60 is disposed on the base 1 of the communication socket, a space is formed between the splice holder 60 and the bottom wall 1a of the base 1. The optical fibers and cables may pass through the space and the space can be used for storing residual lengths of the optical fibers.

In the following, process for splicing fibers to the communication socket 100 as shown in FIG. 1 with the splicing holder 60 of the invention will be described.

A space is formed between splice holder and base for bare fiber storage. The splice holder 60 is installed to the bottom wall 1a of the communication socket 100 by the installation member 11. And cable is introduced into the communication socket by the opening created by removing one of the thin walled portions 14 in the side walls 1b of the base 1 or the fiber optic inlets in the bottom wall 1a of the base 1. It should be noted that different standard cables can be mounted using optical cable adapter 50 shown in FIG. 7. Alternatively, the splice holder 60 can be installed on the base 1 after cables with the fibers being introduced into the communication socket 100. For example, when cable is introduced through the fiber inlets near the splicing holder mounting position, the cable is firstly introduced and fixed in a fixing groove followed by the installation of the splicing holder.

Then, one optical fiber from the incoming optical fiber cable and a fiber from a fiber pigtail may be inserted into splicing sleeve 4 from opposite ends. The fiber is spliced to one another by either a fusion splice or by actuating a mechanical splice. The splicing sleeve 4 may then be inserted and secured in splicing channels 7a, 7b in splice holder 60. Next, the end of the other optical fiber pigtail is inserted into the fiber connector socket 3. The fiber connector socket 3 is placed into the opposing grooves of the posts in the fiber socket mounting portion 23 in the base 1 of the communication socket 100. Meanwhile, the remaining optical fibers can be stored in the space formed between the splice holder 60 and the bottom wall 1a of base 1 of the communication socket, so that the interior of the communication socket is more orderly.

In addition, depending on requirements, the electrical cable can be inserted through the central hole 8 on the base 1, and connect to the electrical cable connector jack 19, then the electrical cable connector jack 19 is installed into the grooves on the posts 241, so that the communication socket has the function of electrical cable termination. It should be noted that the communication socket possess the functions of optical cable and/or electrical cable connection as required.

Lastly, the cover 2 is positioned over the base 1 and secured in place. Thus, completing the installation of the inventive communication socket.

The inventive communication socket 100 having splice holder 60 achieves coupling of two optical fibers inside the communication socket. This increasing the convenience of connecting and installing an electrical cable and optical fiber in the same communication socket. Additionally, the splice holder and the corresponding communication socket according to the present invention can reduce the size of communication socket while maintaining the minimum bending radius of the optical fiber inside of the communication socket.

It should be noted that the communication socket 100 and the splice holder 60 of the invention also can be applied in other small on-wall optical fiber terminal box. Further, it also can be applied in a small optical fiber distribution box to protect the fiber connecting points.

The description of present invention is only for illustration purpose, and therefore, modifications, alterations and substitutions may be made in these embodiments without departing from the principles and spirit of the invention, the scope of which is defined in the claims and the equivalents thereof.

What the claim is:

1. A communication socket, comprising:
   a base having a bottom wall and a plurality of sidewalls;
   a cover which is removably fitted with said base;
   a plurality of optical fiber inlets provided on the bottom wall and sidewalls of the base; and
   a splice holder disposed on said base for holding a splicing sleeve, the splice holder comprising
      a body;
      at least a splice channel provided on a surface of said body;

an elastic device provided in each splice channel for holding a splicing sleeve elastically in said splice channel; and an arched optical fiber guiding part bent away from the surface of the splice holder on which the splice channel is provided and forming an optical fiber inlet with a sloped entrance portion to guide fibers from a first storage elevation to a second splicing elevation, wherein a space is formed between said splice holder and a bottom wall of the base in said communication socket, wherein optical fiber can be stored in said space.

2. The splice holder according to claim 1, wherein said elastic device comprises a flexible arm provided in said splice channel.

3. The splice holder according to claim 2, wherein each splice channel has two of said flexible arms, wherein the flexible arm is provided opposite to a central partition of said splice channel, so as to hold the splicing sleeve against the central partition.

4. The splice holder according to claim 2, wherein the flexible arms are provided on a central partition of said splice channel opposing to both sides of said splice channel, so as to hold the splicing sleeve against the sides thereof.

5. The splice holder according to claim 1, further comprising an optical fiber guiding part, said optical fiber guiding part includes:

a first optical fiber guiding wall integrally formed with and extending from the body; and a second optical fiber guiding wall which is formed by extending a second side wall adjacent to a second splice channel opposing the central partition thereof.

6. The splice holder according to claim 5, wherein said optical fiber guiding part further comprises a third optical fiber guiding wall, said third optical fiber guiding wall is disposed opposite to the first optical fiber guiding wall and extends outwardly from an edge of the second optical fiber guiding wall.

7. The splice holder according to claim 6, wherein said third optical fiber guiding wall is shorter than said first optical fiber guiding wall.

8. The splice holder according to claim 7, wherein a wing is provided at a distal end of said third optical fiber guiding wall, for preventing the optical fiber being detached from said optical fiber guiding part.

9. The splice holder according to claim 1, further comprising at least a installation member provided on splice holder for engaging said splice holder to a communication socket.

10. The communication socket according to claim 1, further comprising:

at least an optical fiber socket for coupling with optical fiber in said communication socket;

an optical fiber socket mounting portion provided on said bottom wall, wherein a height of the fiber socket mounting portion allows installation of two stacked optical fiber sockets.

11. The communication socket according to claim 1, wherein said optical fiber socket is coupled to the optical fiber in said communication socket by a fiber pigtail.

12. The communication socket according to claim 1, further comprising an optical fiber cable adapter disposed near the optical fiber inlet, wherein the optical fiber cable adapter secures the optical cable entering through the optical fiber inlet.

13. The communication socket according to claim 1, further comprising:

an electrical cable connector jack for coupling a cable introduced in the socket; and an electrical jack mounting portion may be provided on the bottom wall to install said cable connector.

* * * * *

UNITED STATES PATENT AND TRADEMARK OFFICE
CERTIFICATE OF CORRECTION

| | | |
|---|---|---|
| PATENT NO. | : 8,270,797 B2 | Page 1 of 1 |
| APPLICATION NO. | : 12/679791 | |
| DATED | : September 18, 2012 | |
| INVENTOR(S) | : Zhou et al. | |

It is certified that error appears in the above-identified patent and that said Letters Patent is hereby corrected as shown below:

Column 4,
Line 23, after "include" insert -- 3M™ No Polish Connector SC socket, --.

Signed and Sealed this
Eighth Day of January, 2013

David J. Kappos
*Director of the United States Patent and Trademark Office*